United States Patent [19]

Hong

[11] Patent Number: 5,481,155
[45] Date of Patent: Jan. 2, 1996

[54] LINEAR INDEX FOR RECTILINEAR DRIVING DEVICE

[75] Inventor: Yeh S. Hong, Seoul, Rep. of Korea

[73] Assignee: Korea Institute of Science and Technology, Seoul, Rep. of Korea

[21] Appl. No.: 197,240

[22] Filed: Feb. 16, 1994

[30] Foreign Application Priority Data

Dec. 21, 1993 [KR] Rep. of Korea .................. 28839/1993

[51] Int. Cl.[6] .................................................. H02K 41/00
[52] U.S. Cl. .......................................... 318/135; 318/696
[58] Field of Search .................................. 318/696, 685, 318/135; 310/12–14

[56] References Cited

U.S. PATENT DOCUMENTS

| | | | |
|---|---|---|---|
| 4,733,143 | 3/1988 | Chitayat | 318/135 |
| 4,766,358 | 8/1988 | Higuchi | 318/135 |
| 4,774,447 | 9/1988 | Teramachi | 318/135 |
| 4,857,782 | 8/1989 | Tokio et al. | 318/135 X |

Primary Examiner—David S. Martin
Attorney, Agent, or Firm—Ostrolenk, Faber, Gerb & Soffen

[57] ABSTRACT

A linear index for a rectilinear driving device. This linear index divides a total driving section of the rectilinear driving device at regular intervals and forcibly drives and stops this device step by step using an electric signal, thus to precisely stop the piston of the cylinder at several random positions. The linear index comprises a linear index bar having a plurality of index protrusions spaced out at regular intervals, an index unit for moving the linear index bar step by step by ½ of the interval between the index protrusions in accordance with electric control signals, a main pneumatic cylinder connected to the linear index bar through a vertical connection member in order to cooperate with the linear index bar, and a programmable logic controller for outputting the electric control signals to the index unit. The index unit includes a pair of index parts oppositely positioned such that they face each other with interposition of the linear index bar therebetween, a projection extending from each of the index parts toward the linear index bar and a pair of proximity sensors mounted on opposed sides of the projection.

8 Claims, 9 Drawing Sheets

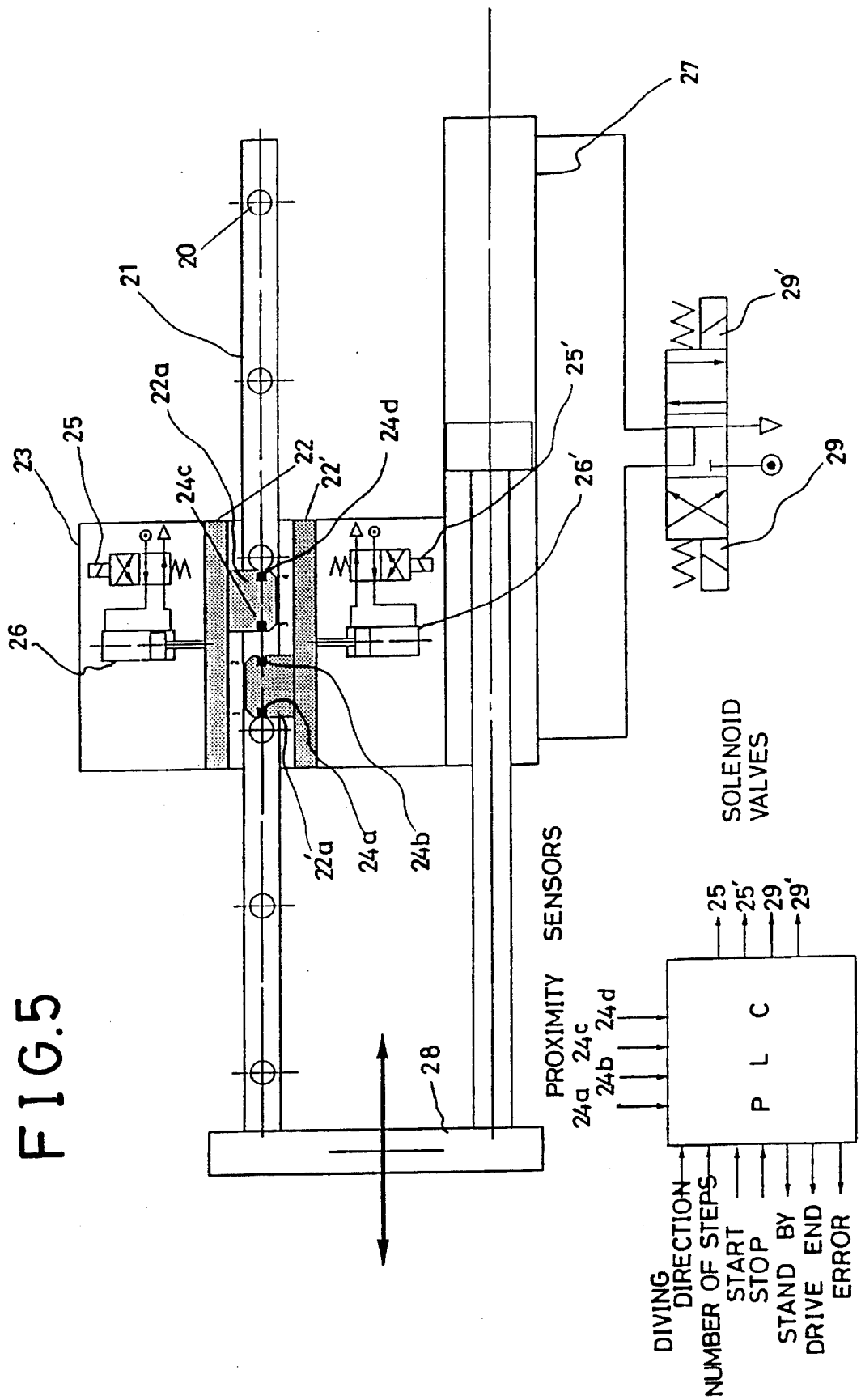

LINEAR INDEX FOR RECTILINEAR DRIVING DEVICE

BACKGROUND OF THE INVENTION

1. Field of the Invention

The present invention relates in general to a linear index and, more particularly, to a linear index for dividing a total driving section of a rectilinear driving device, comprising a pneumatic cylinder, a hydraulic cylinder or an electric motor with a lead screw, at regular intervals and for forcibly driving and stopping the device step by step using electric logic signals.

2. Description of the Prior Art

As well known to those skilled in the art, a low-priced pneumatic cylinder, a kind of representative rectilinear driving device, has a simple construction and is recently necessarily used in automation of varieties of industrial machinery.

With reference to FIG. 1, there is shown a typical pneumatic cylinder assembly as a rectilinear driving device. This typical pneumatic cylinder assembly comprises a programmable logic controller (PLC) 1, a solenoid valve 2 and a pneumatic cylinder 3. A carrier 5 is coupled to the free end of a piston of the cylinder 3 and is rectilinearly moved along a linear bearing 4 in accordance with advancing and refraction of the piston. In this pneumatic cylinder assembly, the carrier 5 coupled to the piston of the cylinder 3 is rectilinearly moved between opposed ends of a stroke section D when a drive control signal of the PLC 1 is applied to the solenoid valve 2.

When it is required to stop the piston of the cylinder 3 at a random position of the stroke section D of the pneumatic cylinder assembly, a pair of proximity sensors 6a and 6b are placed above the moving path of the carrier 5 as shown in FIG. 2. Each of those sensors 6a and 6b senses approach of the moving carrier 5 and outputs a sensing signal to the PLC 1. Upon reception of the output signals of the sensors 6a and 6b, the PLC 1 outputs a logic signal to the solenoid valve 2, thus to automatically close this valve 2 and to stop the piston of the cylinder 3 at the desired random position of the stroke section D.

However, since the air for driving the piston of the above pneumatic cylinder 3 has a high compressibility and the piston of the cylinder 3 operates with a relatively higher frictional force, the probability in that the practical stop position of the piston is within the allowance of the designated stop position is statistically very low even though the solenoid valve 2 is correctly closed at the designated position.

One approach to overcoming the above problem is use of pneumatic piston brake means about the piston rod of the cylinder 3 as shown in FIG. 3. The pneumatic piston brake means comprises a pneumatic brake 8 driven by a solenoid valve 7 and improves the precision of stopping of the piston at the stop position. However, this technique using the pneumatic piston brake means has a problem in that it can not assure the piston of high precision of then stop position when the response velocity of the piston brake means is not uniform.

In a rectinlinear driving device using proximity sensors, one should increase the number of the proximity sensors proportion to the number of desired stop positions of piston in the stroke section D. Therefore, this type of rectilinear driving device has another problem in that it should require a complex logic controller which is adapted to compare the present position of the piston with a designated position using the output signals of the proximity sensors 6a and 6b and to apply a logic signal, corresponding to the logic condition, to the solenoid valve 2.

Another problem of the above rectilinear driving device resides in that its proximity sensors should be displaced when the stop positions of the piston are changed.

In this regard, it is noted that, a rectilinear driving device comprising a lead screw combined with either of a step motor and a position controllable servo motor is preferably used in a rectilinear driving operation in which a precise stop function for stopping the piston of the cylinder at several stop positions should be required together with random change of the stop positions.

Referring to FIG. 4, there is shown a typical rectilinear driving device having a step motor and a lead screw. In operation of this rectilinear driving device, the electric step motor 11 is driven when a drive signal of a stepping motor drive unit 9, which drive unit 9 has been programmed with a driving direction and a step number, is applied to the step motor 11 coupled to reduction gears 10. The rotational force of the step motor 11 is transmitted to the lead screw 12 coupled thereto and rotates this lead screw 12. This lead screw 12 is rotatably supported at its opposed ends by a pair of radial bearings 13a and 13b. In accordance with rotation of the lead screw 12, a carrier 14 coupled to this lead screw 12 is rectilinearly moved under the guide of a linear bearing 15 or stopped at a predetermined stop position.

However, this type of rectilinear driving device having a step motor or a positional controllable servo motor has a problem in that it increases the cost due to the motor.

SUMMARY OF THE INVENTION

It is, therefore, an object of the present invention to provide a linear index for a rectilinear driving device in which the aforementioned problems can be overcome and which divides a total driving section of a rectilinear driving device, comprising a pneumatic cylinder, a hydraulic cylinder, an electric motor and a lead screw, at regular intervals and forcibly drives and stops this device step by step using an electric signal, thus to precisely stop the piston of the cylinder at several random positions by input of the drive step number.

In accordance with the above object, a linear index for a rectilinear driving device in accordance with an embodiment of the present invention comprises: a linear index bar having a plurality of index protrusions, the protrusions being spaced out at regular intervals; an index unit for moving the linear index bar step by step by ½ of the interval between the index protrusions in accordance with electric control signals; a main pneumatic cylinder connected to the linear index bar through a vertical connection member in order to cooperate with the linear index bar; and a programmable logic controller for outputting the electric control signals to the index unit, whereby the linear index drives the rectilinear driving device step by step throughout a total driving section of the rectilinear driving device.

BRIEF DESCRIPTION OF THE DRAWINGS

The above and other objects, features and other advantages of the present invention will be more clearly understood from the following detailed description taken in conjunction with the accompanying drawings, in which:

FIG. 5 is a front view of a linear index for a rectilinear driving device in accordance with an embodiment of the present invention;

DESCRIPTION OF THE PREFERRED EMBODIMENTS

Figure 1:
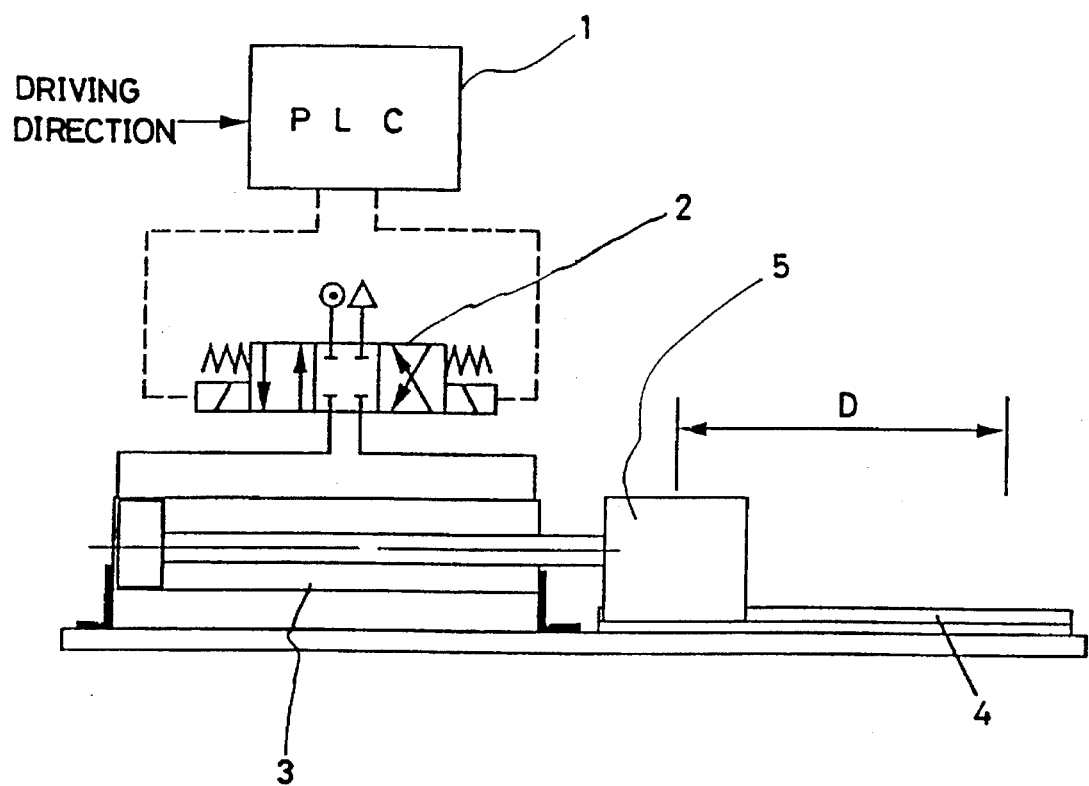
FIG. 1 is a front view showing a basic construction of a typical rectilinear driving device having a pneumatic cylinder.
Figure 2:
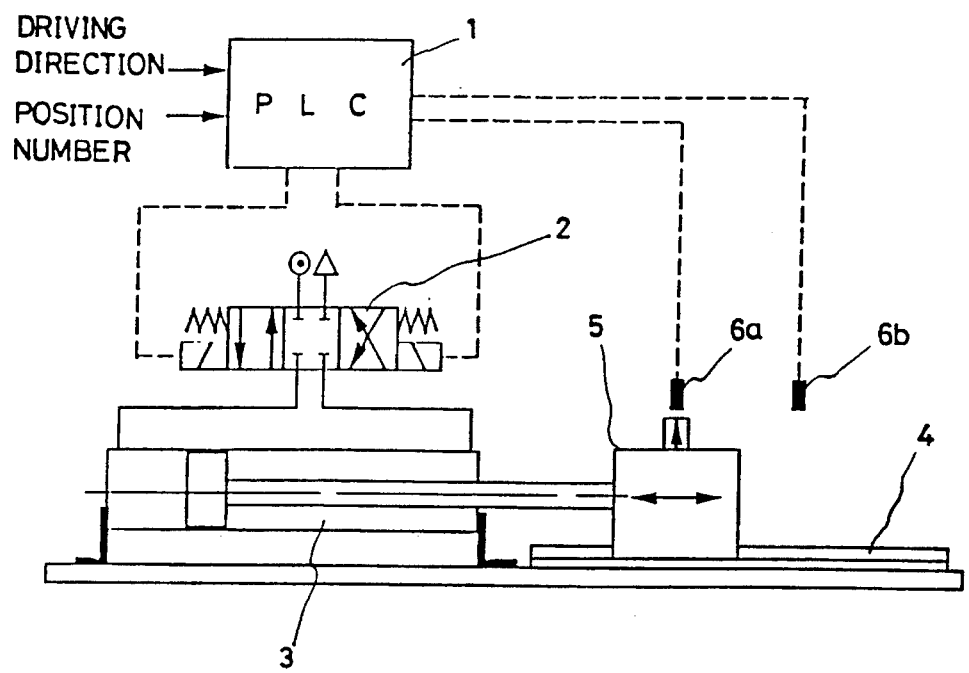
FIG. 2 is a front view corresponding to FIG. 1, but provided with a pair of proximity sensors for stopping a piston of the cylinder at a random position of a stroke section.
Figure 3:
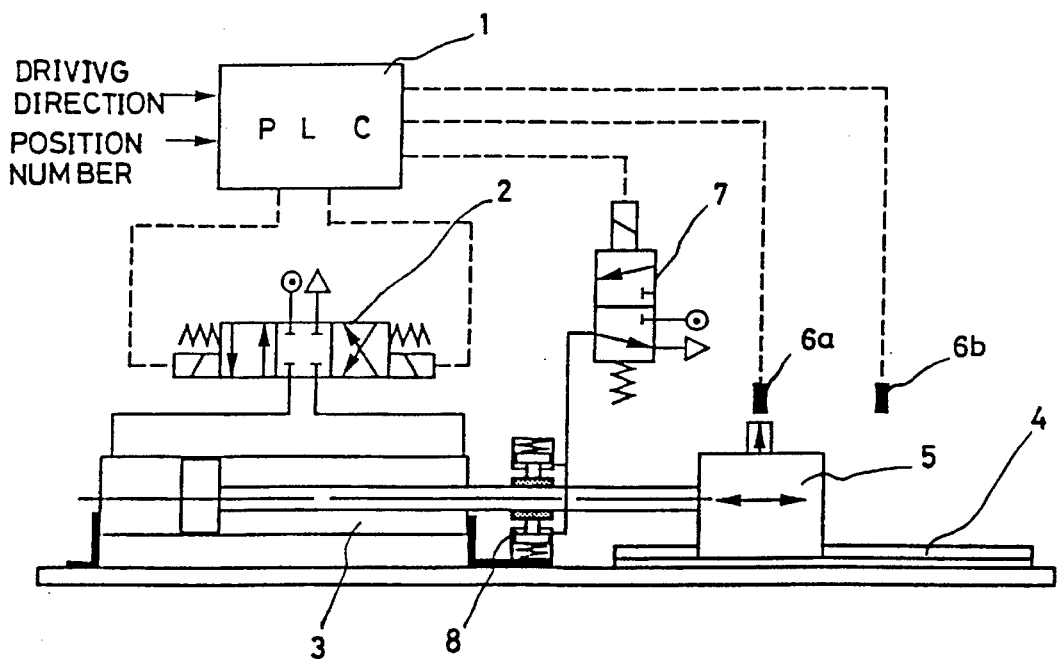
FIG. 3 is a front view corresponding to FIG. 2, but provided with pneumatic piston brake means about the piston rod of the cylinder for improving the precision of stopping operation of the piston.
Figure 4:
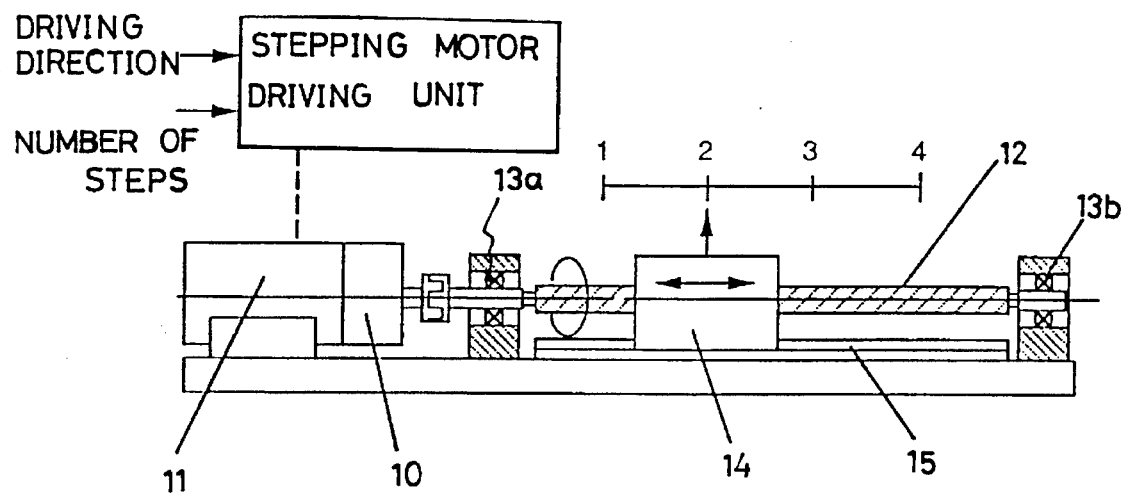
FIG. 4 is a front view corresponding to FIG. 1, but showing another embodiment of the prior art which can stop, using a step motor, the piston at several positions.

With reference to FIG. 5, there is shown a linear index for a rectilinear driving device in accordance with an embodiment of the present invention. The linear index comprises a linear index bar 21 having a plurality of index protrusions 20 on a longitudinal front surface thereof. These index protrusions 20 are spaced out at regular intervals. An index unit 23 is movably positioned on the moving path of the linear index bar 21 and comprises a pair of index parts 22 and 22' which are oppositely placed such that they face each other with interposition of the linear index bar 21 therebetween.

The index parts 22 and 22' of the index unit 23 have projections 22a and 22'a which have a predetermined width and vertically extend toward the linear index bar 21, respectively. Each of the projections 22'a and 22a is provided on its opposed sides with a pair of proximity sensors 24a and 24b or 24c and 24d, respectively.

The above index parts 22 and 22' of the index unit 23 are directly connected to pistons of pneumatic cylinders 26 and 26', respectively. The pneumatic cylinders 26 and 26' are driven under the control of a pair of first solenoid valves 25 and 25', respectively. Hence, the index parts 22 and 22' are moved in a direction perpendicular to the axial direction of the linear index bar 21, respectively.

The linear index bar 21 is connected at one end thereof to a vertical connection member 28 which is in turn connected to the free end of a piston of a pneumatic cylinder 27. Hence, the linear index bar 21 is indirectly connected to the piston of the cylinder 27 and cooperates with this piston. Here, the pneumatic cylinder 27 is driven under the control of a pair of second solenoid valves 29 and 29'.

The first solenoid valves 25 and 25', driving the index parts 22 and 22' of the index unit 23 respectively, and the second solenoid valves 29 and 29', driving the main cylinder 27, are controlled in their operations by output signals of a PLC 30. The PLC 30 having a logic control program applies electric control signals to the solenoids 25, 25', 29 and 29' while checking the sensing signals outputted from the proximity sensors 24a to 24d in response to input of driving direction and the number of steps, thus to drive step by step the piston of the pneumatic cylinder 27 by ½ of the interval of the spaced index protrusions 20 of the linear index bar 21.

Turning to FIGS. 6a to 6g, there are shown successive steps of the index operation of the linear index, comprising the index parts 22 and 22' and the linear index bar 21, during advancing of the piston of the main pneumatic cylinder 27 or during a leftward movement of the piston.

Figure 6A:
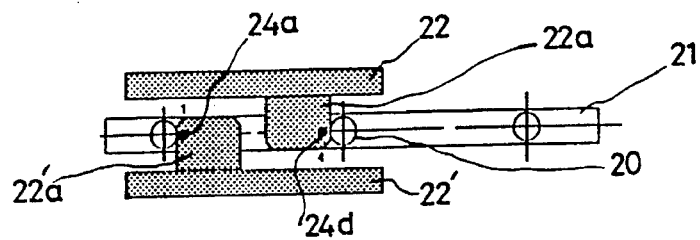
FIGS. 6a to 6g are views showing successive steps of a linear index operation of the linear index of FIG. 5 during advancing of a piston of a pneumatic cylinder of the rectilinear driving device.

At the state of FIG. 6a or at a random initial state, the right-side proximity sensor 24d of the upper index part 22 and the left-side proximity sensor 24a of the lower index part. 22' close to individual index protrusions 20 of the linear index bar 21, so that the sensors 24a and 24d are turned on.

Figure 6B:
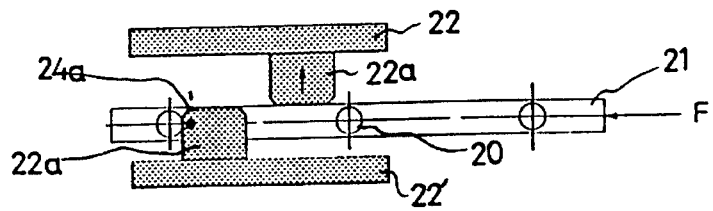

When an electric control signal of the PLC 30 is applied to the solenoid valve 25 of the upper index part 22 at the state of FIG. 6a, the upper index part 22 is retracted by the pneumatic cylinder 26 and turns off its proximity sensor 24d as shown in FIG. 6b. In this state, when the solenoid valve 29 of the main pneumatic cylinder 27 is applied with a control signal of the PLC 30, the linear index bar 21 is moved leftwards by advancing of the piston of the main cylinder 27, thus to achieve the positional state of FIG. 6c.

Figure 6C:
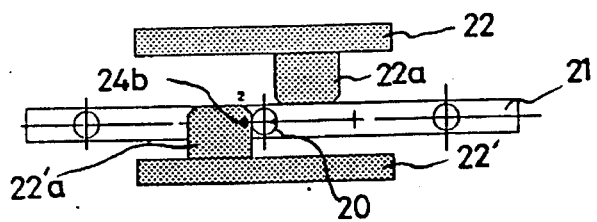

When the right-side proximity sensor 24b of the lower index part 22' is turned on in accordance with movement of the linear index bar 21 as shown in FIG. 6c, the control signals of the PLC 30, having been applied to the solenoid valve 25 of the upper index part 22 and to the solenoid valve 29 of the main cylinder 27 respectively, are not applied thereto any more. Hence, the upper index part 22 of the index unit 23 returns to its original position in order to achieve the positional state of FIG. 6d. In this state of FIG. 6d, the index protrusion 20 is fixed between both the projections 22a and 22'a and, at the same time, extinguishes the driving force of the main cylinder 27.

Figure 6D:
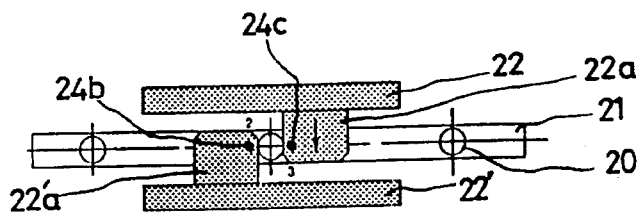

When the upper index part 22 returns to its original position as shown in FIG. 6d, the left-side proximity sensor 24c of its projection 22a is turned on in order to inform the operator of finishing of one cycle of the linear index operation.

Figure 6E:
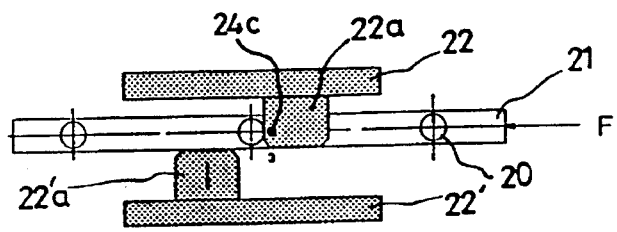

In order to drive the main cylinder 27 of FIG. 6d leftwards by one step, a control signal of the PLC 30 is applied to the solenoid valve 25' of the lower index part 22', thus to drive the pneumatic cylinder 26' of the lower index part 22' in order to retract this lower index part 22' as shown in FIG. 6e.

Figure 6F:
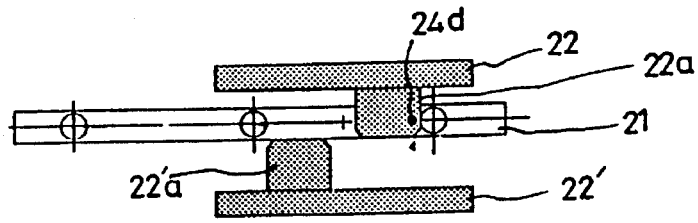
Figure 6G:
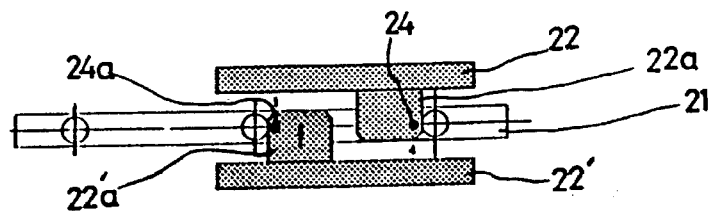

As the lower index part 22' is retracted as shown in FIG. 6e, the output signal of the right-side proximity sensor 24b of the lower index part 22' is cut off. When the solenoid valve 29 of the main cylinder 27 in the state of FIG. 6e is applied with the control signal of the PLC 30, the piston of the main cylinder 27 is driven leftwards, thus to achieve the positional state of the linear index bar 21 of FIG. 6f. When the linear index bar 21 is moved leftward as shown in FIG. 6f, the right-side proximity sensor 24d of the upper index part 22 is turned on and outputs a signal. The output signal of the sensor 24d is used in cutting off the signal having been applied to the solenoid valve 25' of the lower index part 22'. When the signal applied to the solenoid valve 25' is cut off, the lower index part 22' returns to its original position and, at the same time, the driving force of the main cylinder 27 is extinguished. In this case, two index protrusions 20 of the linear index bar 21 come into close contact with and are fixed by corresponding sides of the projections 22a and 22'a of the upper and lower index parts 22 and 22', respectively, as shown in FIG. 6g. The left-side proximity sensor 24a of the lower index part 22' is thus turned on, thus to achieve the initial state of FIG. 6a.

Turning FIGS. 7a to 7g, there are shown successive steps of the index operation of the linear index, comprising the index parts 22 and 22' and the linear index bar 21, during retraction of the piston of the main pneumatic cylinder 27 or during a rightward movement of the piston.

In the retraction of the piston of the main cylinder 27 of FIGS. 7a to 7g, the theory and stepped process remain the same as in the advancing of the piston of FIGS. 6a to 6g, but the operational order of the two index parts 22 and 22' is different as follows.

That is, in the linear index operation of FIGS. 6a to 6g, the upper index part 22 in the initial state of FIG. 6a is retracted as shown in FIG. 6b. The linear index bar 21 advances by one step as shown in FIG. 6c and, thereafter, the upper index part 22 returns to its initial state as shown in FIG. 6d, thus to fix an index protrusion 20 by the projections 22a and 22'a of the index parts 22 and 22' and to end the cycle of the linear index operation. Thereafter, the lower index part 22' in the initial state of FIG. 6d is retracted as shown in FIG. 6e. The linear index bar 21 advances by one step as shown in FIG. 6f and, thereafter, the lower index part 22' returns to its initial state as shown in FIG. 6g, thus to return to the initial state of FIG. 6a.

Figure 7A:
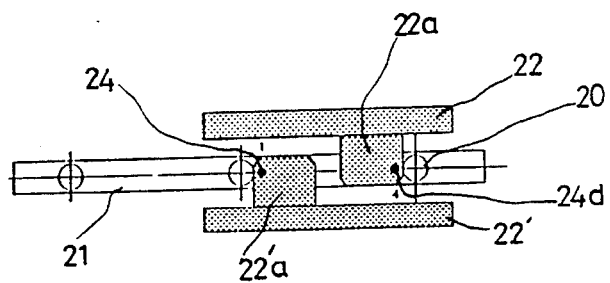
FIGS. 7a to 7g are views showing successive steps of a linear index operation of the linear index of FIG. 5 during retraction of the piston of the pneumatic cylinder of the device.
Figure 7B:
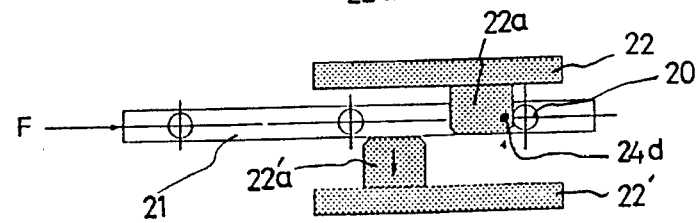
Figure 7C:
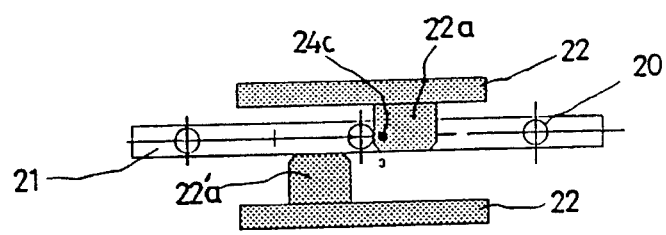
Figure 7D:
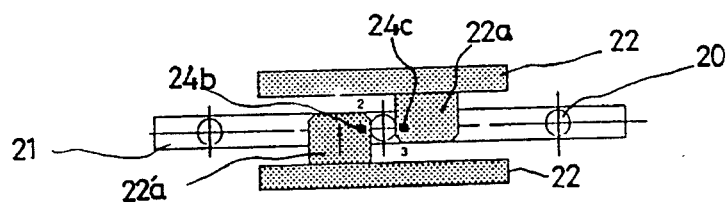
Figure 7E:
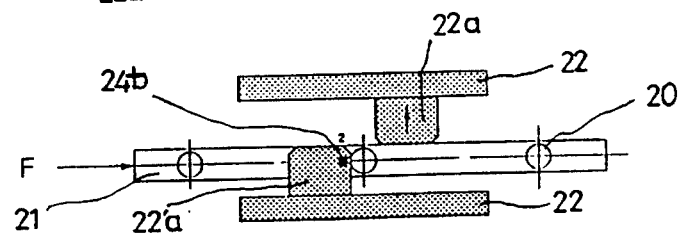
Figure 7F:
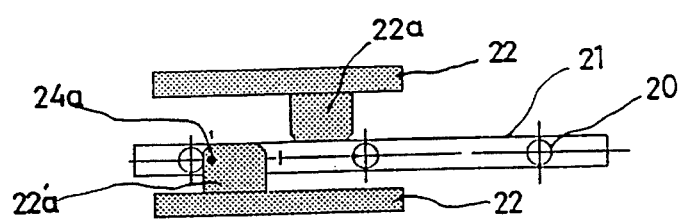
Figure 7G:
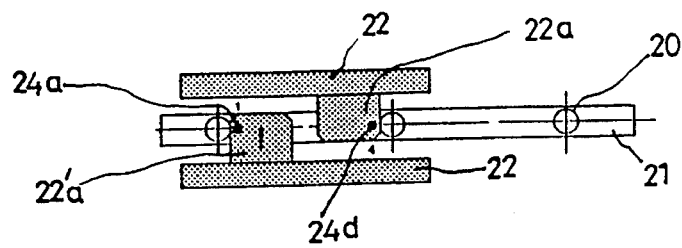

On the contrary, in the linear index operation of FIGS. 7a to 7g, the lower index part 22' in the initial state of FIG. 7a is retracted as shown in FIG. 7b. The linear index bar 21 is retracted by one step as shown in FIG. 7c and, thereafter, the lower index part 22' returns to its initial state as shown in FIG. 7d, thus to fix an index protrusion 20 by the projections 22a and 22'a of the index parts 22 and 22' and to end one cycle of the linear index operation. Thereafter, the upper index part 22 in the initial state of FIG. 7d is retracted as shown in FIG. 7e. The linear index bar 21 is retracted by one step as shown in FIG. 7f and, thereafter, the upper index part 22 returns to its initial state as shown in FIG. 7g, thus to return to the initial state of FIG. 7a.

Figure 8:
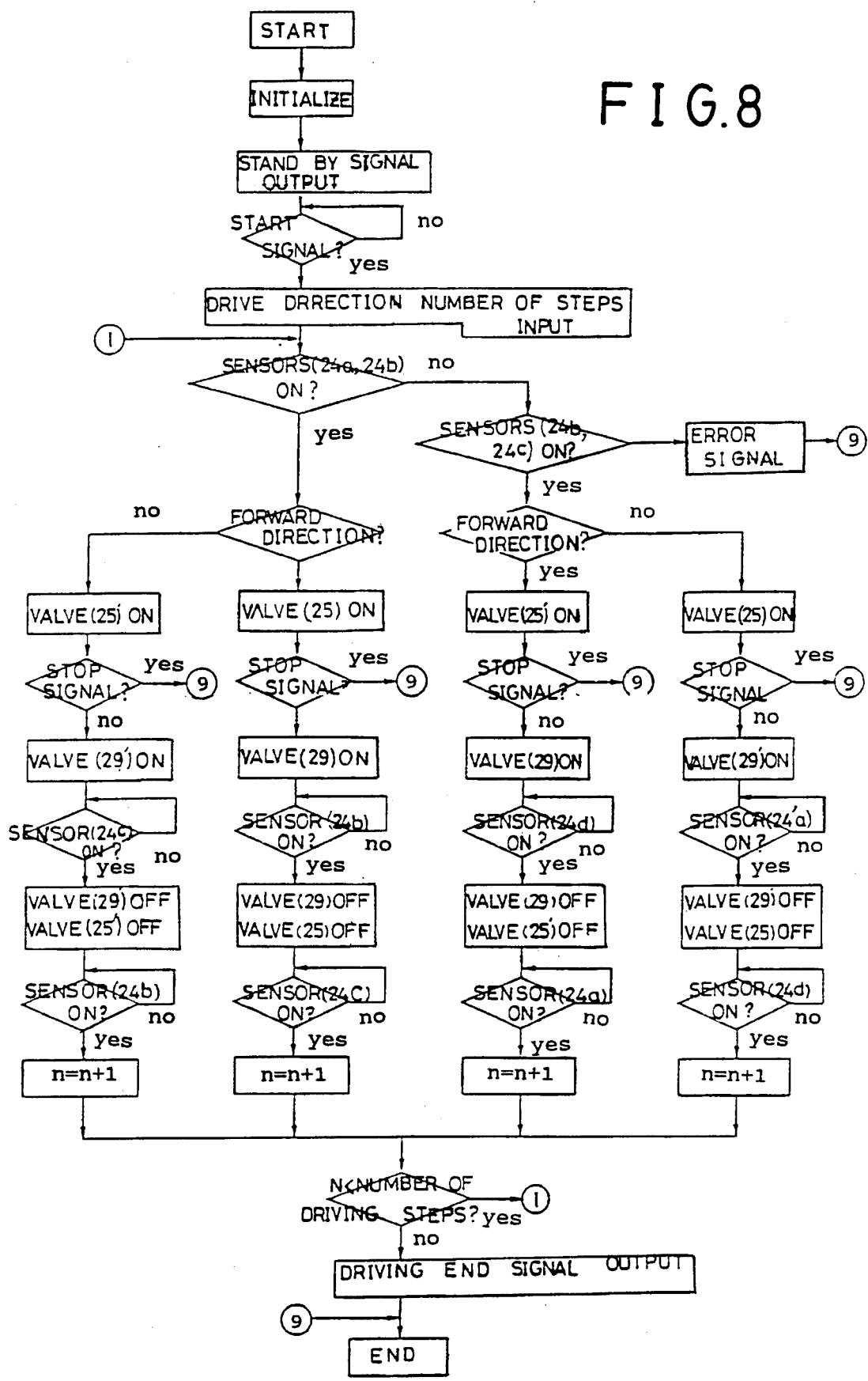
FIG. 8 is a flowchart, of a logic control program of the linear index of the present invention.

FIG. 8 is a flowchart of a logic control program of the linear index of the present invention. As represented in this flowchart, when the PLC 30 is applied with a driving direction and the number of driving steps of the main pneumatic cylinder 27, the PLC 30 discriminates the present positional state of the linear index bar 21 on the basis of the output signals of the proximity sensors 24a to 24d. Thereafter, the PLC 30 controls the upper and lower index parts 22 and 22' and the main pneumatic cylinder 27 by outputting control signals to their solenoids 25, 25', 29 and 29' in accordance with the processes of FIGS. 6a to 6g and FIGS. 7a to 7g.

As described above, the linear index of the present invention is preferably combined with a pneumatic cylinder and drives, by outputting control signals to solenoid valves, the pneumatic cylinder by a predetermined number of steps of regular intervals.

Figure 9:
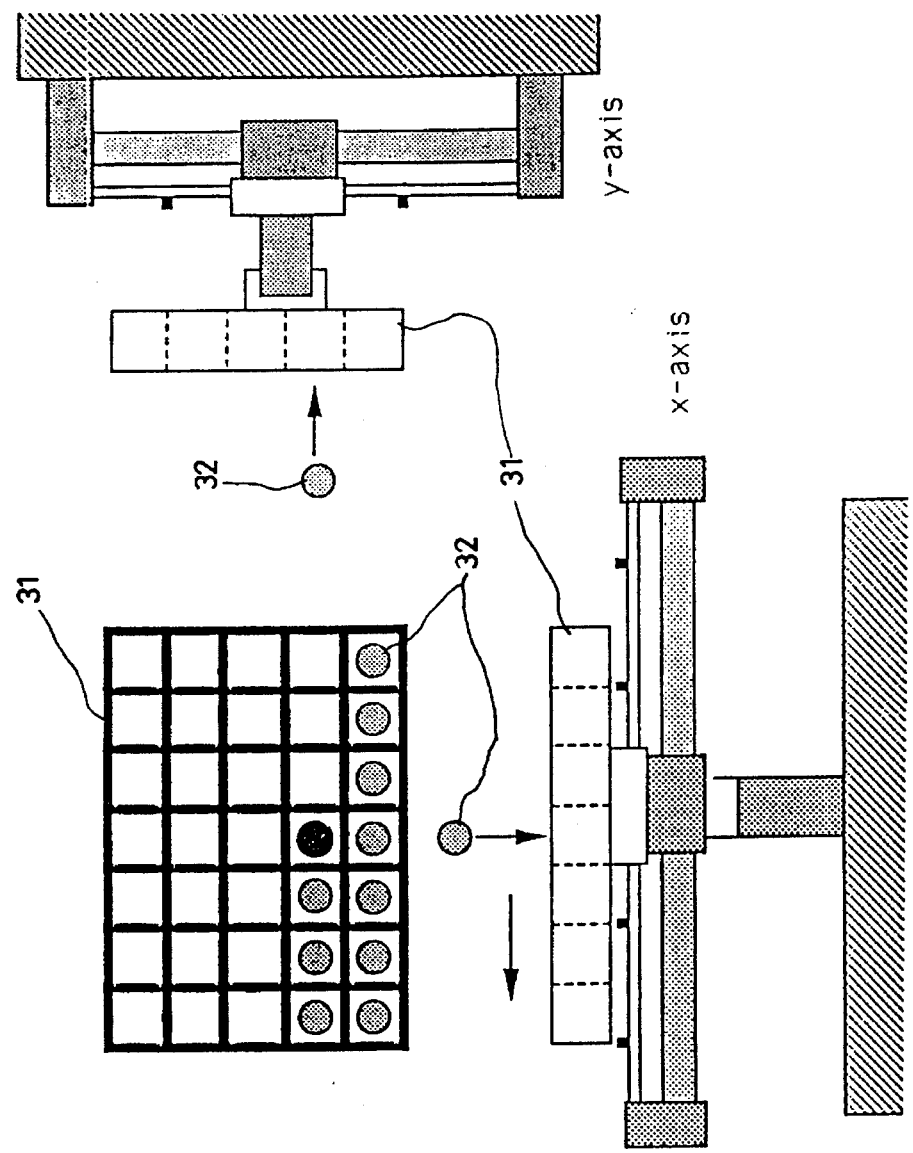
FIG. 9 is a schematic view showing a construction of a pelletizer to which the linear index of the present invention is adapted.

With reference to FIG. 9, there is shown a bi-axial pelletizer to which the above linear index is adapted.

As well known to those skilled in the art, the bi-axial pelletizer is used in automatically loading or taking work pieces 32 on or out of a lattice pallet 31 of an automated production line. In the prior art, a pair of linear drive shafts having individual electric drive motors are arranged such that they are perpendicular to each other. In this state, the lattice pallet 31 is moved on the two drive shafts forward, backward, rightward and leftward at regular intervals by electric control signals.

On the contrary, the bi-axial pelletizer having the linear index of this invention uses a low-priced and simple pneumatic cylinder as the rectilinear driving device, thus to remarkably reduce the cost in comparison with the prior art pelletizer using the drive motors.

It should be understood that the linear index of the present invention can be used in combination with a hydraulic cylinder other than the aforementioned pneumatic cylinder.

Figure 10:
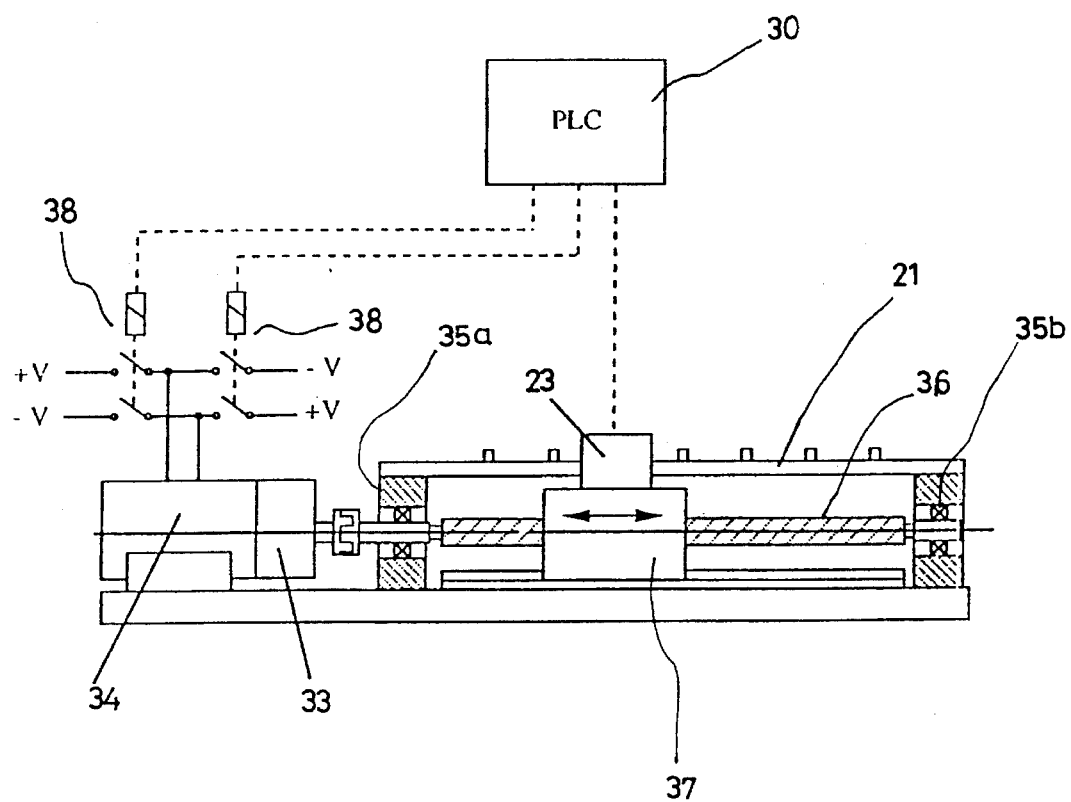
FIG. 10 is a front view of am electric driving device to which the linear index of the present invention is adapted.

When the linear index of the present invention is used in combination with the hydraulic cylinder, the linear index is designed such that its shock resistance is increased in consideration of the higher driving force of the hydraulic cylinder than that of the pneumatic cylinder. In this case, the linear index drives the hydraulic cylinder step by step at regular intervals in the same manner as described in the pneumatic cylinder, In addition, when the linear index of the present invention is adapted to a rectilinear driving device comprising an electric driving motor, having no positional control function, and a lead screw as shown in FIG. 10, it may yield the same result as that described above. In this case, an electromagnet other than the pneumatic cylinder may be used for driving the index parts, thus to drive the rectilinear driving device only by electric power.

That is, a lead screw 36 is rotatably supported by a pair of radial bearings 35a and 35b at its opposed ends and driven by the rotational force of a DC motor 34 having reduction gears 33. The linear index bar 21 and the index unit 23 are placed on and supported by the radial bearings 35a and 35b. The index unit 23 and the DC motor 34 are driven in accordance with the electric control signals of PLC 30, so that a carrier 37 integrally formed with the index unit 23 is rectilinearly moved along the lead screw 36 step by step.

In FIG. 10, the reference numerals 38a and 38b denote a forward relay and a backward relay, respectively.

As described above, a linear index for a rectilinear driving device of the present invention divides a total driving section of the rectilinear driving device, comprising a pneumatic cylinder, a hydraulic cylinder or an electric motor with a lead screw, at regular intervals and forcibly drives and stops, using electric logic signals, the device at random positions step by step with higher precision.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A linear index for stepwise driving of a linear driving device comprising:

a linear index bar having a plurality of index protrusions, said protrusions being spaced at regular intervals;

an index unit for stepwise moving said linear index bar by ½ of the interval between said index protrusions in accordance with electric control signals, said index unit including a pair of index parts oppositely positioned to face each other with said linear index bar being interposed therebetween, a projection extending from each of said index parts toward said linear index bar, a pair of proximity sensors mounted on opposed sides of said projection and sensing the approach of said index protrusions of the index bar, and drive means for moving said index parts forward and backward in accordance with said electric control signals; and a programmable logic controller for outputting said electric control signals to said index unit, whereby said linear index allows a stepwise movement of the linear driving device throughout a total driving stroke of the linear driving device.

2. The linear index according to claim 1, wherein said drive means comprises;

a pair of pneumatic cylinders connected to said pair of index parts in order to move said index parts forward and backward, respectively; and a pair of solenoid valves driving said pair of pneumatic cylinders in response to said control signals of the programmable logic controller, respectively.

3. The linear index according to claim 1, wherein said drive means comprises;

a pair of electromagnets for moving said index parts forward and backward, respectively.

4. The linear index according to claim 1, wherein said linear driving device is one of a pneumatic cylinder, an hydraulic cylinder and a device having both an electric drive motor and a lead screw rotated by said drive motor.

5. A linear index for stepwise driving of a linear driving device comprising:

a linear index bar coupled to the linear driving device and having a plurality of index protrusions, said protrusions being spaced at regular intervals;

an index unit for allowing stepwise moving of said linear index bar in response to movement of said linear driving device, said stepwise moving being by ½ of the interval between said index protrusions in accordance with electric control signals, said index unit including a pair of index parts oppositely positioned to face each other with said linear index bar being interposed therebetween, a projection extending from each of said index parts toward said linear index bar, a pair of proximity sensors mounted on opposed sides of said projection and sensing the approach of said index protrusions of the index bar, and drive means for moving said index parts forward and backward in accordance with said electric control signals; and a programmable logic controller for outputting said electric control signals to said index unit, said index unit allowing a stepwise movement of the linear driving device throughout a total driving stroke of the linear driving device.

6. The linear index according to claim 5, wherein said drive means comprises;

a pair of pneumatic cylinders connected to said pair of index parts in order to move said index parts forward and backward, respectively; and a pair of solenoid valves driving said pair of pneumatic cylinders in response to said control signals of the programmable logic controller, respectively.

7. The linear index according to claim 5, wherein said drive means comprises;

a pair of electromagnets for moving said index parts forward and backward, respectively.

8. The linear index according to claim 5, wherein said linear driving device is one of a pneumatic cylinder, an hydraulic cylinder and a device having both an electric drive motor and a lead screw rotated by said drive motor.

* * * * *